(12) United States Patent
Wallner

(10) Patent No.: US 11,166,357 B2
(45) Date of Patent: Nov. 2, 2021

(54) TECHNIQUES FOR IMPLEMENTING A CERTAIN LIGHT CHARACTERISTIC

(71) Applicant: TRIDONIC GMBH & CO KG, Dornbirn (AT)

(72) Inventor: Stefan Wallner, Hohenems (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 172 days.

(21) Appl. No.: 16/493,790

(22) PCT Filed: Mar. 15, 2018

(86) PCT No.: PCT/EP2018/056602
§ 371 (c)(1),
(2) Date: Sep. 13, 2019

(87) PCT Pub. No.: WO2018/167241
PCT Pub. Date: Sep. 20, 2018

(65) Prior Publication Data
US 2021/0136897 A1    May 6, 2021

(30) Foreign Application Priority Data
Mar. 17, 2017  (DE) .............. 10 2017 204 479.9

(51) Int. Cl.
*H05B 47/10*      (2020.01)
*G06F 16/245*    (2019.01)
(Continued)

(52) U.S. Cl.
CPC .......... *H05B 47/10* (2020.01); *G06F 16/245* (2019.01); *H05B 47/155* (2020.01); *H05B 45/00* (2020.01)

(58) Field of Classification Search
CPC ..................... G06F 16/245; H05B 47/155
See application file for complete search history.

(56) References Cited

U.S. PATENT DOCUMENTS 5,090,520 A    2/1992  Gockel et al.
6,211,626 B1 *  4/2001  Lys ................... H05B 45/3725
                                                          315/291
(Continued)

FOREIGN PATENT DOCUMENTS

CN          1048086          12/1990
DE    10 2012 018 760        3/2013
(Continued)

OTHER PUBLICATIONS

German search report dated Nov. 6, 2017 in priority German application 10 2017 204 479.9.
(Continued)

*Primary Examiner* — Kurtis R Bahr
(74) *Attorney, Agent, or Firm* — Andrus Intellectual Property Law

(57) ABSTRACT

The invention relates to an electronic database (101) having entries for a plurality of operating devices (151) and a plurality of lamps (152), which electronic database is searched on the basis of a query (115). The query (115) indicates a light characteristic. On the basis of the search of the electronic database (101), a combination of a selected operating device and a selected lamp is determined and an electrical operating point of the selected operating device is determined. Then, an output (116) is provided, which indicates the selected operating device, the selected lamp and the determined operating point.

10 Claims, 5 Drawing Sheets

(51) Int. Cl.
*H05B 47/155* (2020.01)
*H05B 45/00* (2020.01)

(56) References Cited

U.S. PATENT DOCUMENTS

| | | | | |
|---|---|---|---|---|
| 10,517,161 | B2* | 12/2019 | Thijssen | H04Q 9/00 |
| 2011/0068702 | A1* | 3/2011 | van de Ven | H05B 45/10 |
| | | | | 315/186 |
| 2015/0076996 | A1 | 3/2015 | Flatz | |
| 2015/0120246 | A1* | 4/2015 | Shrubsole | G01R 31/44 |
| | | | | 702/182 |
| 2016/0066386 | A1* | 3/2016 | Catalano | H05B 45/58 |
| | | | | 315/309 |
| 2016/0165702 | A1* | 6/2016 | Lai | H05B 47/16 |
| | | | | 315/201 |

FOREIGN PATENT DOCUMENTS

| | | |
|---|---|---|
| DE | 10 2012 205 964 | 10/2013 |
| DE | 10 2013 203 879 | 9/2014 |
| DE | 10 2013 015 814 | 4/2015 |
| EP | 3142464 | 3/2017 |
| KR | 20160015800 | 2/2016 |
| WO | 2008104927 | 9/2008 |
| WO | 2013186670 | 12/2013 |
| WO | 2015025267 | 2/2015 |
| WO | WO 2016/156090 A1 * | 10/2016 ............. H05B 37/02 |

OTHER PUBLICATIONS

Austria search report dated Mar. 2, 2018 in co-pending Austria patent application GM 86/2017.
PCT search report dated Jul. 3, 2018 in parent PCT application PCT/EP2018/056602.
Osram technical guide as downloaded Sep. 12, 2019 (URL: https://www.osram.de/media/resource/HIRES/334143/3698889/technical-guide—ecgs-for-t5-lamps.pdf) as cited in PCT search report.

* cited by examiner

TECHNIQUES FOR IMPLEMENTING A CERTAIN LIGHT CHARACTERISTIC

CROSS REFERENCE TO RELATED APPLICATIONS

The present application is the U.S. national stage application of international application PCT/EP2018/056602 filed Mar. 15, 2018, which international application was published on Sep. 20, 2018 as International Publication WO 2018/167241 A1. The international application claims priority to German Patent Application 10 2017 204 479.9 filed Mar. 17, 2017.

TECHNICAL FIELD

Various embodiments of the invention generally relate to techniques for achieving a certain light characteristic in the illumination. Various examples of the invention relate in particular to searching an electronic database having entries for a plurality of operating devices and a plurality of lamps and determining a combination of a selected operating device and a selected lamp as well as of an electrical operating point of the selected operating device based on the search of the database.

BACKGROUND

When illuminating scenes and objects, it can often be necessary to implement a specific light characteristic. For example, it may be necessary to implement a specific light intensity.

Modern solid state-based lamps can have a certain manufacturing tolerance. For example, it is observed that, despite having nominally identical process parameters, different manufacturing cycles can provide lamps with different light characteristics. It is sometimes even possible for different lamps within a manufacturing cycle to have different light characteristics. It is also observed that the light characteristic of a lamp can depend on the operating device used, which supplies the light with energy. For these reasons, it is often difficult to implement a specific light characteristic. According to the reference implementations, it may in particular be necessary for the installer to perform a manual calibration of the operating point of the operating device in order to implement the desired light characteristic. However, such a manual adjustment can be time-consuming and cost-intensive and also prone to error. Reproducibility when setting certain light characteristics according to reference implementations may be limited, for example. This can in particular be the case with respect to the light intensity.

SUMMARY

For this reason, there is a need for improved techniques for implementing a light characteristic. There is in particular a need for techniques that eliminate at least some of the aforementioned limitations and drawbacks.

This object is achieved by the features of the independent claims. The features of the dependent claims define embodiments.

A method comprises searching an electronic database having entries for a plurality of operating devices and for a plurality of lamps. Searching is based on a query. The query indicates a light characteristic. The method further comprises determining a combination of a selected operating device from the plurality of operating devices and a selected lamp from the plurality of lamps as well as of an electrical operating point of the selected operating device. Said determination is based on the search of the electronic database. The method further comprises the provision of an output. The output indicates the selected operating device, the selected lamp and the determined operating point.

The respective different operating devices can provide energy for operating the corresponding lamp. To do this, the operating devices can include an upconverter or a downconverter, for example. The operating devices can, for example, include a transformer and/or a smoothing filter. The operating devices can include an AC/DC converter, for example. Different operating devices from the plurality of operating devices can have different specifications with regard to the implementable operating points. For example, some operating devices can provide a stronger current or a higher voltage than other operating devices.

Different types of lamps can be used in the various examples described herein. For example, the database could include entries for different types of lamps. Lamps can include solid state-based lamps, for example, such as light-emitting diodes. Other examples include gas-discharge lamps, halogen lamps and incandescent lamps.

The electronic database could be implemented in a decentralized manner, for example. For example, the electronic database could be searched via a server connected to the Internet.

The combination of the selected operating device and the selected lamp, as well as the corresponding electrical operating point of the selected operating device, can have particularly good agreement with the light characteristic specified in the query. These techniques can therefore make it possible to identify the combination of the selected operating device and the selected lamps with the corresponding operating point that captures the desired light characteristic particularly well. In particular, a manual configuration can be omitted or at least supported by the electronic query.

For example, it would be possible for the method to further comprise the programming of the selected operating device for operation at the determined operating point, for example automatically on the basis of the output.

The programming can include access to an internal memory of the operating device, for example, whereby corresponding configuration data can be stored in the memory of the operating device. As a result, the operation of the selected operating device can be initiated at the determined operating point. For example, the current-voltage characteristic of the operating device could thereby be set.

The programming of the selected operating device could, for example, include the creation of an electronic configuration file. This configuration file could include an identification of the selected operating device, an identification of the selected lamp and a configuration parameter for the operating point. The electronic configuration file could, for example, also optionally include an identification of the query or the output in relation to the search of the electronic database. It is then possible for the electronic configuration file to be transmitted to the selected operating device, for example via wireless communication, for example Bluetooth, Zigbee, Wi-Fi, etc. Such a technique makes it possible to implement a temporal separation between the provision of the output and the transmission of the electronic configuration file to the selected operating device. The electronic configuration file, for example, can thus be created within the context of commissioning the selected operating device and the selected lamp on the spot; whereas the query to the database can take place at a different point in time, for example in a planning phase. This increases the flexibility and in particular makes it possible to make the on-site commissioning particularly quick.

In the various examples described herein, one or more different light characteristics can be taken into consideration. For example, the light characteristic could comprise at least one element selected from the following group: a light intensity; a light color; a light efficiency; a tolerance for the light intensity; a tolerance for the light color; and a spatial light distribution.

The light intensity can, for example, refer to the luminous flux related to a specific spatial angle, for example in the unit Candela. The light color can, for example, refer to the spectral distribution or the light temperature of the light. The light efficiency can, for example, indicate a relationship between the light intensity and the electrical energy consumed to operate the corresponding lamp. The tolerance of the light intensity or the tolerance of the light color can specify an accuracy with which the implementation of a specific light intensity or light color can be ensured. It would also be possible for the tolerance to refer to a time drift of the corresponding variable, for example as a function of the operating hours. The spatial light distribution can, for example, describe a geometric radiation characteristic of the lamp.

For example, it is possible for at least some entries of the electronic database to specify a dependence of the light characteristic of a respective lamp of the plurality of lamps on the combined operating device of the plurality of operating devices. This means that it can be possible for the light characteristic of a specific lamp to vary depending on which operating device this light is combined with for operation. Mapping this dependence in the database allows the desired light characteristics to be implemented in a particularly precise manner.

Accordingly, for example, it would be possible for at least some entries of the electronic database to specify a dependence of the light characteristic of a respective lamp of the plurality of lamps on the operating point of the combined operating device of the plurality of operating devices. This means that a lamp can have different light characteristics depending on which operating point the combined operating device is being operated at. Mapping this dependence in the database allows the desired light characteristics to be implemented in a particularly precise manner.

Therefore, with the suitable selection of the operating device and the corresponding operating point, the light characteristic can typically be set across a specific range. This can result in being able to implement the desired light characteristic with more than one combination of a selected operating device with a selected lamp or an associated operating point. Therefore, in some examples, it would also be possible for a number of combinations, respectively consisting of a selected operating device and a selected lamp as well as of an associated operating point to be determined and the output to indicate said number of combinations. In such a case, the user could select the appropriate combination from the number of combinations or specify additional criteria to narrow the sample space.

Different techniques can be used to create the entries in the database. In some examples, it may in particular be possible to perform one or more calibration measurements during manufacturing within the context of a back-end testing process. Such calibration measurements can be carried out for individual lamps or for test lamps that are representative for a number of lamps, for example a production series.

For example, it would be possible to carry out a number of calibration measurements of the light characteristic for a lamp to be characterized. In doing so, different calibration measurements of the number of calibration measurements can relate to different combinations of the lamps to be characterized with operating devices and/or different operating points of the operating device. It is then possible to create an entry in the database for the lamp to be characterized on the basis of the calibration measurements. In other words, it may be possible to test a lamp to be characterized with a number of operating devices within the context of the respective calibration measurements. This makes it possible to precisely identify which light characteristic can be provided by the corresponding lamp in combination with the various operating devices.

Depending on the granularity with which these calibration measurements are carried out, it is correspondingly possible for the respective entries in the database to be representative of individual lamps, or representative of production series of lamps. In particular with regard to lamps that have a large manufacturing tolerance even within production series, for example, it may be desirable to carry out the calibration measurements for individual lamps. This allows the light characteristic to be implemented in a particularly precise manner.

A variety of techniques that make it possible to specify a certain light characteristic on the basis of the query have been described above. Alternatively or additionally, however, it would also be possible for the query to specify one or more properties of the operating device. Examples of such properties can, for example, describe geometric dimensions or compatibility with specific interface technologies. The sample space can thereby be narrowed further. It would, for example, be possible for the query to further indicate an operating mode of the operating device selected from the following group: a light management capability; a drift as a function of time and/or as a function of the temperature; a life span; a dimming capability; and an operating mode.

The light management capability can, for example, refer to compatibility with certain control protocols, such as the phase control modulation of AC voltage or a DALI bus system or another control bus system. Drift as a function of time and/or as a function of the temperature can, for example, describe a stability of the selected operating point as a function of said parameters. The life span can, for example, describe a typical number of operating hours until a failure event occurs on the basis of statistical expectations. Dimming capability can, for example, describe a capability of the operating device to operate the lamp with different light intensities. The dimming operating mode can, for example, refer to an electronic implementation of a dimmer operation. The dimming operating mode could refer to a pulse width modulation, for example. The dimming operating mode could, for example, refer to an operation of a corresponding DC/DC converter, such as a continuous operation or an intermittent operation.

The electrical operating point can generally refer to different electrical operating characteristics of the operating device. For example, the electrical operating point could refer to a power consumption of the operating device. It would, for example, also be possible for the operating point to include a load current provided to the lamp by the operating device. The operating point could also include a load current provided to the lamp by the selected operating device as a function of the time. The operating point could include a load current provided to the lamp by the selected operating device as a function of the operating time. A drift in certain stability parameters of the operating device could be estimated.

An apparatus comprises at least one processor. The at least one processor is configured to perform the following steps: Searching an electronic database having entries for a plurality of operating devices and a plurality of lamps based on a query, which indicates a light characteristic; Based on the search of the electronic database: determining a combination of a selected operating device from the plurality of operating devices and a selected lamp from the plurality of lamps as well as of an electrical operating point of the selected operating device; and providing an output, which indicates the selected operating device, the selected lamp and the determined operating point.

A computer program comprises program code that can be executed by at least one processor. Execution of the program code causes the processor to perform a method comprising the following steps: Searching an electronic database having entries for a plurality of operating devices and a plurality of lamps based on a query, which indicates a light characteristic; based on the search of the electronic database: determining a combination of a selected operating device from the plurality of operating devices and a selected lamp from the plurality of lamps as well as of an electrical operating point of the selected operating device; and providing an output, which indicates the selected operating device, the selected lamp and the determined operating point.

A computer program product comprises a program code that can be executed by at least one processor. Execution of the program code causes the processor to perform a method comprising the following steps: Searching an electronic database having entries for a plurality of operating devices and a plurality of lamps based on a query, which indicates a light characteristic; based on the search of the electronic database: determining a combination of a selected operating device from the plurality of operating devices and a selected lamp from the plurality of lamps as well as of an electrical operating point of the selected operating device; and providing an output, which indicates the selected operating device, the selected lamp and the determined operating point.

The features discussed above and features which will be described in the following can be used not only in the corresponding, explicitly discussed combinations, but also in other combinations or in isolation, without leaving the scope of protection of the present invention.

BRIEF DESCRIPTION OF THE FIGURES

The above-described properties, features, and advantages of this invention, as well as the manner in which they are achieved, will become clearer and more understandable in the context of the following description of the design examples, which will be explained in more detail in connection with the drawings.

DETAILED DESCRIPTION OF EMBODIMENTS

The present invention will be explained in more detail in the following on the basis of preferred embodiments with reference to the drawings. In the figures, the same reference signs refer to the same or similar elements. The figures are schematic illustrations of various embodiments of the invention. Elements shown in the figures are not necessarily drawn to scale. Rather, the various elements shown in the figures are reproduced in such a way that their function and general purpose is comprehensible to the person skilled in the art. Connections and couplings between functional units and elements shown in the figures can also be implemented as an indirect connection or coupling. A connection or coupling can be implemented in a wired or wireless manner. Functional units can be implemented as hardware, software, or a combination of hardware and software.

Various techniques to implement a desired light characteristic on the basis of a database query are described in the following. These techniques are based on the insight that, due to the many different options for combining different lamps with different operating devices, a particularly large parameter space exists. This parameter is further increased by the option to operate operating devices at different operating points. The selection of the suitable combination of operating device and lamp and associated operating point can therefore be particularly complex and error-prone in reference implementations.

With the techniques described herein, it is possible to search an electronic database having entries for a plurality of operating devices and a plurality of lamps on the basis of a query which indicates a light characteristic of a lamp. Based on the search of the electronic database, it is then possible to determine a combination of a selected operating device from the plurality of operating devices and a selected lamp from the plurality of lamps as well as of an electrical operating point of the selected operating device. An output can be provided, which indicates the selected operating device, the selected lamp and the determined operating point.

Figure 1:
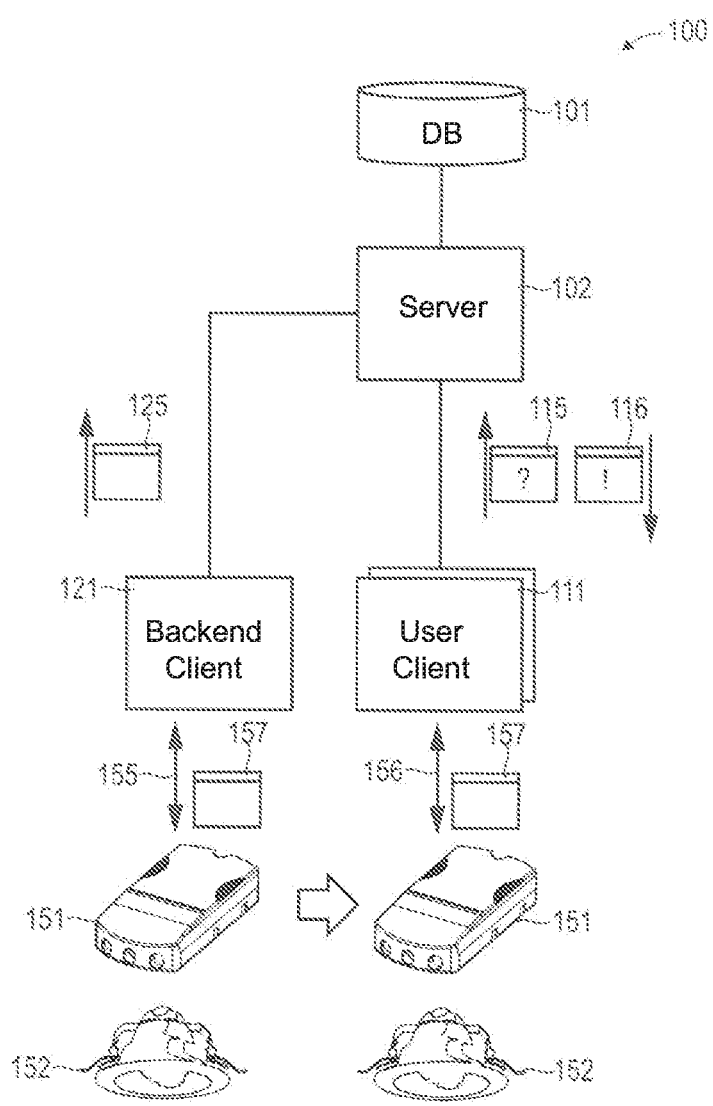
FIG. 1 schematically illustrates a system having a user terminal, a server and a database according to various examples.

FIG. 1 illustrates aspects relating to a system 100, which comprises a corresponding database 101. In the example of FIG. 1, the database 101 is accessed by a server 102, for example an Internet server. A user terminal 111, for example a laptop, a mobile phone or a portable installation device, is configured to send a query 115 to the server 102. Said query 115 indicates a desired light characteristic. The database 101 can then be searched on the basis of this query 115.

Database 101 includes entries for a plurality of operating devices 151 and a plurality of lamps 152. Based on the search of the electronic database, it is then possible to determine a combination of a selected operating device 151 from the plurality of operating devices and a selected lamp 152 from the plurality of lamps 152 as well as of an electrical operating point of the selected operating device 151. This combination with the associated operating point can achieve the desired light characteristic particularly well. The determined combination together with the operating point can be transmitted to the terminal 111 in the form of an output 116.

In some examples, there could be a corresponding display on the terminal 111, for example, which indicates the combination with the associated operating point. In some examples, a plurality of combinations with associated operating points could be indicated as well, so that a user of the terminal 111 could select the suitable combination with the corresponding operating point.

FIG. 1 further shows that it is possible to program the operating device 151 for operation at the determined operating point. Such programming could, for example, be performed by a manufacturer or a distributor. A corresponding data connection 155 between a backend device 121 and the operating device 151 can then be established, for example in the area of a factory or a warehouse. Alternatively or additionally, it would also be possible for the programming of the operating device 151 to take place within the context of commissioning. In such an example, a data connection 156 could be established between the operating device 151 and the terminal 111 of the user (wherein the same terminal 111, which is also used for the query 115 and the output 116, or a different terminal, can be used for the data connection 156). The data connection 156 could, for example, be established in the area of the location at which the lamp 152 and the operating device 151 are to be installed.

The programming of the operating device 151 could, for example, include the creation of a configuration file 157. This configuration file 157 can include an identification of the operating device 151 and the lamp 152, as well as a configuration parameter for the determined operating point. Providing the identification of the operating device 151 and the identification of the lamp 152 can ensure that the correct operating device 151 is configured on the basis of the configuration file 151.

Techniques as described above with reference to FIG. 1 can be used flexibly for a wide variety of light characteristic types. The light characteristic could relate to a specific light intensity of the lamp 152, for example. However, it would alternatively or additionally also be possible for the light characteristic to, for example, relate to a light color, a light efficiency, a tolerance of the light intensity, a tolerance of the light color and/or a spatial light distribution of the lamp 152. Relevant information can also be included in the output 116.

Figure 2:
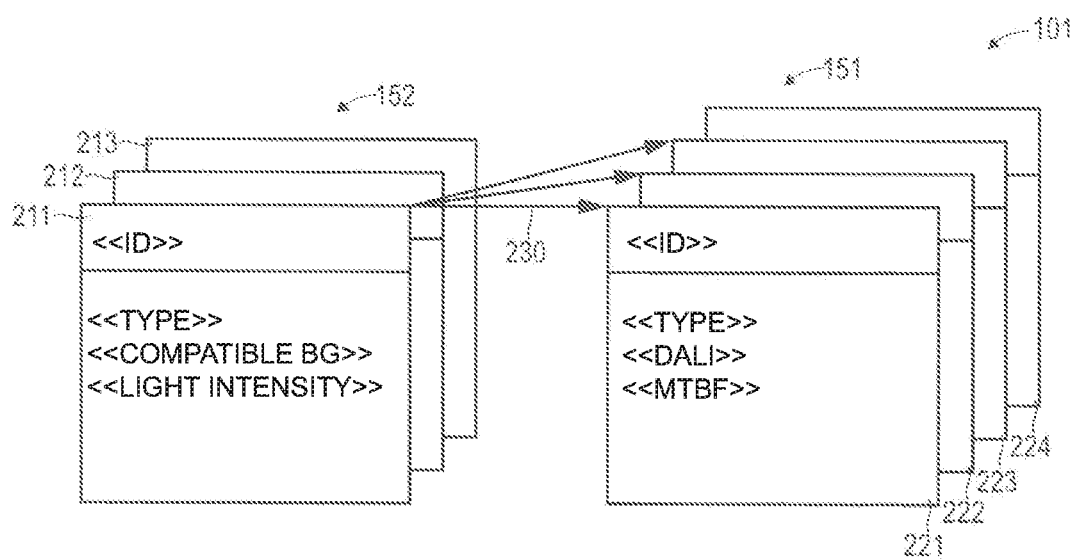
FIG. 2 schematically illustrates entries in the database for a plurality of operating devices and a plurality of lamps according to various examples.

FIG. 2 illustrates aspects related to entries in the database 101. In the example of FIG. 2, the database 101 includes a number of entries 211-213 for different lamps 152, as well as a number of entries 221-224 for different operating devices 151. Such a structure of the database 101 is purely exemplary, however, and in other examples it would, for example, also be possible for different entries to describe direct combinations of lamps 152 and operating devices 151.

In the example of FIG. 2, the database 101 also includes links 230 between various entries 211-213 for lamps 152 and entries 221-224 for operating devices 151 (for the sake of clarity, only the links 230 for the entry 211 are shown in FIG. 2). These links 230 can, for example, describe a basic compatibility for a combination of the corresponding lamp 152 of the respective entry 211 with the respective operating device 151 of the corresponding entry 221-224. In the scenario shown in FIG. 2 for example, the lamp 152 corresponding to the entry 211 is compatible with the operating devices 151, which correspond to the entries 221-223.

FIG. 2 further shows that the entries 211-213 for the lamps 152 include an identification of the respective lamp, for example a serial number, etc. The entries 211-213 also include a type name and a list of compatible operating devices 151 defining the links 230. The specification for the light characteristic is stored in the entries 211-213 as well (in the example of FIG. 2, the light intensity is shown).

FIG. 2 further shows that the entries 221-224 for the operating devices 151 in turn include an identification of the respective operating device 151. The entries 221-224 also include a type name, as well as a light management capability (FIG. 2 shows whether the DALI bus is supported), as well as a life span (FIG. 2 shows the mean time between failures).

The specific information content that can be stored in the different entries 211-213, 221-224 can vary in different implementations.

On the basis of such entries 211-213, 221-224, it is generally possible to specify a dependence of the light characteristic of the respective lamp 152 on the combined operating device 151. Dependencies of the light characteristic of the respective lamp 152 on the operating point of the combined operating device can be specified as well.

Figure 3:
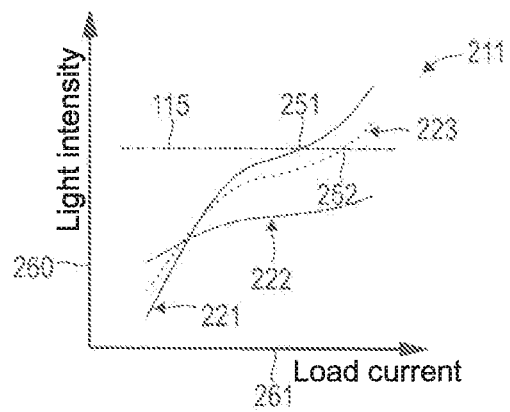
FIG. 3 schematically illustrates a dependence of a light intensity on a load current for various operating devices according to various examples.

FIG. 3 illustrates aspects relating to a dependence of the light intensity of a lamp on the combined operating device 151 and on the used operating point of the respective operating device. FIG. 3 in particular shows the expected light intensity 260 as a function of the load current 261, which is provided to the corresponding lamp 152 by the respective operating device 151.

FIG. 3 shows that different load currents 261 can result in a different light intensity 260. To implement the light intensity 115 specified by the query 115 (dash-dotted line in FIG. 3), there is only one possible combination of the corresponding lamp 152 with the operating devices 151 described by the entries 221, 223. The corresponding operating points 251, 252 are identified in FIG. 3.

Figure 4:
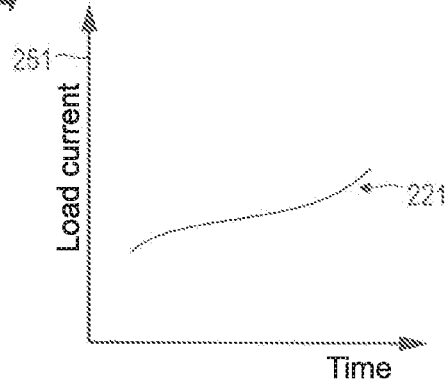
FIG. 4 schematically illustrates a load current as a function of the operating time according to various examples.

FIG. 4 illustrates aspects relating to a time dependence of the load current 261. FIG. 4 in particular shows a scenario in which, in order to achieve the desired light intensity 260, the load current 261 has to be adjusted as a function of the operating time for the operating device 151 according to the entry 221 for the associated lamp 152. It would be possible for such a drift to be stored as a function of the time in the corresponding entry 211-213, 221-224 in the database 101.

Figure 5:
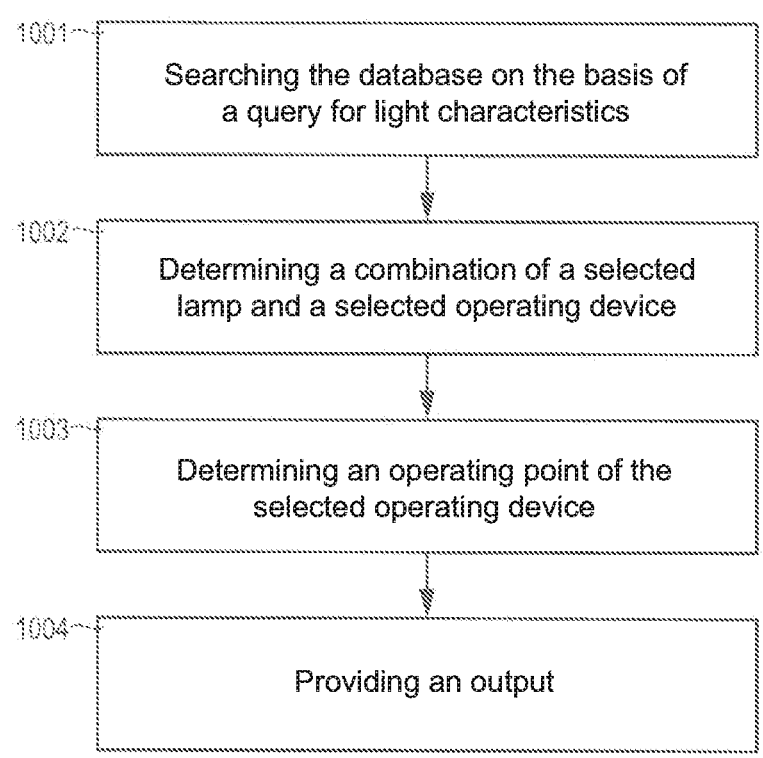
FIG. 5 is a flow diagram of a method according to various examples.

FIG. 5 is a flow diagram of a method according to various examples. To begin with, in Step 1001, a database is searched on the basis of a query for a light characteristic. This light characteristic could, for example, relate to a light intensity, a light color, a light efficiency, a tolerance of the light intensity, a tolerance of the light color and/or a spatial light distribution.

The determination of a combination of a selected lamp and a selected operating device from a plurality of possible combinations then takes place in Step 1002. This is done on the basis of the light characteristic specified in the query. In some examples, it would also be possible to determine several combinations which can in principle implement the queried light characteristic.

Subsequently, in Step 1003, an operating point of the selected operating device is determined. The operating point can, for example, include a load current provided to the selected lamp by the selected operating device and/or the load current as a function of operating time.

An output that is indicative for the determined combination and the determined operating point is then provided in Step 1004. On the basis of the output it is possible, for example, to configure the operating device in a suitable manner. The lamp could optionally also be configured in a suitable manner.

Figure 6:
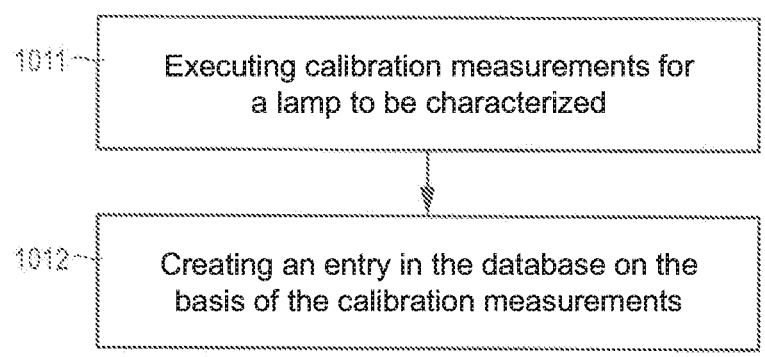
FIG. 6 is a flow diagram of a method according to various examples.

Different techniques for determining the entries 211-213, 221-224 of the database 101 are conceivable. Referring to the previously discussed FIG. 3 or 4: Relevant dependences between the light intensity 260 and the load current 261 and the load current at the determined operating point 251 over time could, for example, be determined on the basis of calibration measurements. FIG. 6 is a flow diagram of a method that illustrates aspects relating to a calibration measurement.

To begin with, in Step 1011, a number of calibration measurements are performed for a lamp to be characterized. Such calibration measurements could, for example, be performed within the context of the back-end testing in the factory. Different calibration measurements can relate to different combinations of a lamp to be characterized with operating devices and/or different operating points of the operating devices.

A corresponding entry is then created in the database on the basis of the calibration measurements for the lamp in Step 1012.

In some examples it would be possible to, for example, carry out the method according to FIG. 6 for each manufactured lamp 152. It is then possible for the entries in the database 101 to be representative of individual lamps 152. In other examples, however, it would also be possible to carry out the method according to FIG. 6 for one or for a subset of all of the lamps of a production series, for which a low manufacturing tolerance or parameter dispersion is assumed. In such an example, it would be possible for the respective entries in the database to be representative of production series of lamps. In such an example, it would, for example, be possible for the various entries 211-213 in the database 101 for lamps 152 to include a plurality of identifications of lamps, namely for all of the lamps of the corresponding production series, for example explicitly or in the form of a parameterization.

Figure 7:
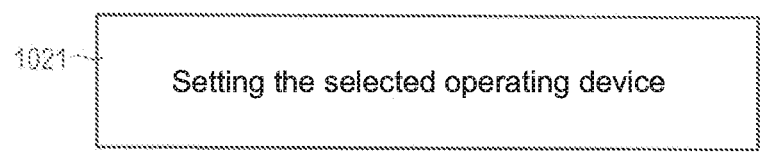
FIG. 7 is a flow diagram of a method according to various examples.

FIG. 7 illustrates a flow diagram of an exemplary method. The method comprises Step 1021, according to which the selected operating device is set. To do this, a suitable configuration file can be transmitted to the operating device 151 and, for example, written into a memory of the operating device 151.

In summary, techniques have been described above which make a precise implementation of a desired light characteristic possible. The techniques described herein are based on a database which includes entries for various lamps and operating devices. This allows tolerances in the implementation of light characteristics to be mapped in the entries. It is in particular possible to achieve a convergence between different types of operating devices and different lamps that are often manufactured by different manufacturers. Inaccuracies and errors in the configuration of the operating devices, and possibly of the lamps, can be avoided. Automatic configuration of the operating devices is possible. The techniques described herein can also be used when replacing existing lamps. In the event of a failure of a lamp, it is possible to replace the faulty lamp with a new lamp. This can be done on the basis of the known or measured light characteristic of the faulty lamp. The existing operating device can be reprogrammed accordingly, for example on the basis of a configuration file provided by the relevant techniques described herein.

Of course, the features of the above-described embodiments and aspects of the invention can be combined with one another. The features can in particular be used not only in the described combinations, but also in other combinations or individually, without leaving the field of the invention.

The invention claimed is:

1. A method of programming an operating device that provides electrical energy to a lamp comprising the steps of:
    searching an electronic database (101) having entries (211-213, 221-224) for a plurality of operating devices (151) and for a plurality of lamps (152) based on a query (115) indicating a desired light characteristic (260);
    based on the search of the electronic database (101), determining a combination of a selected operating device (151) from the entries for the plurality of operating devices (151) and a selected lamp (152) from the entries for the plurality of lamps (152) as well as of an electrical operating point (251, 252) of the selected operating device (151);
    providing an output (116) to a user terminal, which indicates the selected operating device (151), the selected lamp (152), and the determined operating point (251, 252); and
    programming the selected operating device (151) for operation at the determined operating point (251, 252) by creating an electronic configuration file (157), which includes an identification of the selected operating device (151), an identification of the selected lamp (152), and a configuration parameter for the operating point (251, 252), and transferring the electronic configuration file (157) to the selected operating device (151) from the user terminal.

2. The method according to claim 1, wherein the light characteristic (260) comprises at least one element selected from the following group: a light intensity; a light color; a light efficiency; a tolerance for the light intensity; a tolerance for the light color; and a spatial light distribution.

3. The method according to claim 1, wherein at least some entries of the electronic database (101) specify a dependence of the light characteristic (260) of a respective lamp (152) of the plurality of lamps (152) on the combined operating device (151) of the plurality of operating devices (151).

4. The method according to claim 1, wherein at least some entries of the electronic database (101) specify a dependence of the light characteristic (260) of a respective lamp (152) of the plurality of lamps (152) on the operating point (251, 252) of the combined operating device (151) of the plurality of operating devices (151).

5. The method according to claim 1, wherein the respective entries of the database (101) are representative of individual lamps (152) or are representative of production series of lamps (152).

6. The method according to claim 1, wherein the query (115) further indicates an operating mode of an operating device (151) selected from the following group: a light management capability; a drift as a function of time and/or as a function of the temperature; a life span; a dimming capability; and a dimming operating mode.

7. The method according to claim 1, wherein the operating point (251, 252) comprises a load current provided to the selected lamp (152) by the selected operating device (151).

8. The method according to claim 1, wherein the operating point (251, 252) comprises a load current provided to the selected lamp (152) by the selected operating device (151) as a function of the operating time.

9. The method according to claim 1 wherein the transferring the electronic configuration file (157) to the selected operating device (151) is accomplished via wireless communication (156) transferring the electronic configuration file (157) to the selected operating device (151) via wireless communication (156) between the user terminal and the selected operating device.

10. A method comprising:
- searching an electronic database (101) having entries (211-213, 221-224) for a plurality of operating devices (151) and a plurality of lamps (152) based on a query (115), which indicates a light characteristic (260);
- based on the search of the electronic database (101); determining a combination of a selected operating device (151) from the plurality of operating devices (151) and a selected lamp (152) from the plurality of lamps (152) as well as of an electrical operating point (251, 252) of the selected operating device (151); and
- providing an output (116), which indicates the selected operating device (151), the selected lamp (152), and the determined operating point (251, 252);
- performing a number of calibration measurements of the light characteristic (260) for a lamp to be characterized (152), wherein different calibration measurements of the number of calibration measurements relate to different combinations of the lamp to be characterized (152) with operating devices (151) and/or different operating points of the operating devices; and
- based on the calibration measurements, creating an entry in the database (101) for the lamp (152) to be characterized.

* * * * *